July 29, 1947.  R. H. GODDARD  2,424,610
ROTATING COMBUSTION APPARATUS
Filed April 12, 1943  4 Sheets-Sheet 3
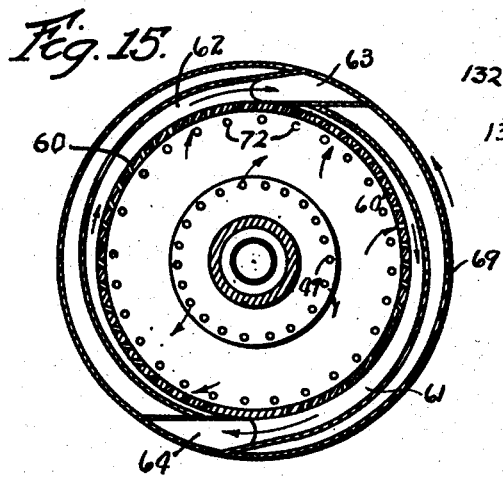
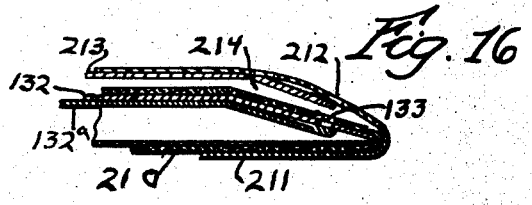
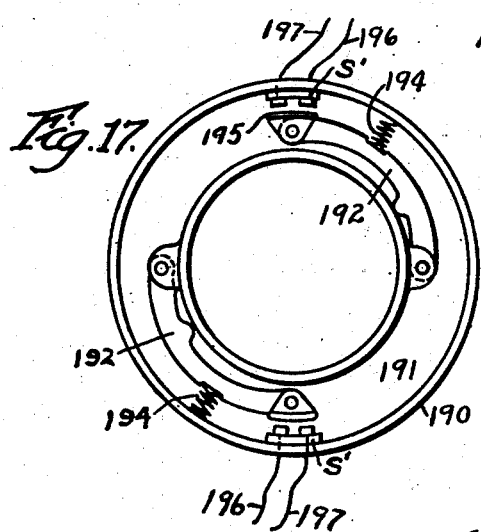
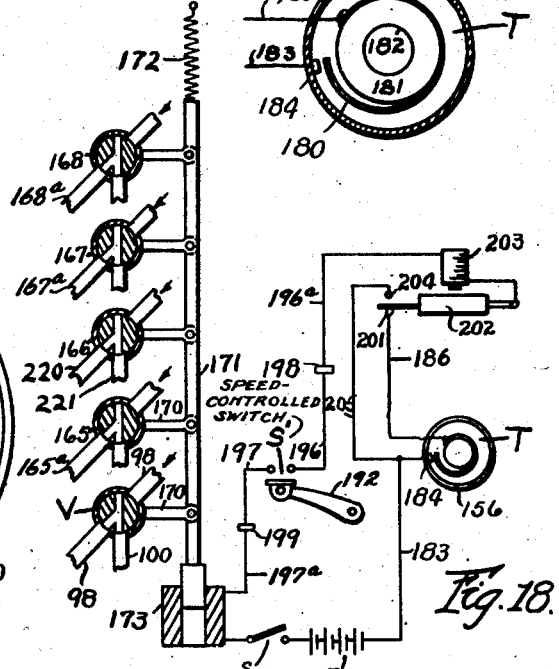
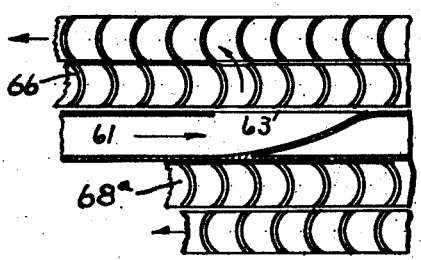
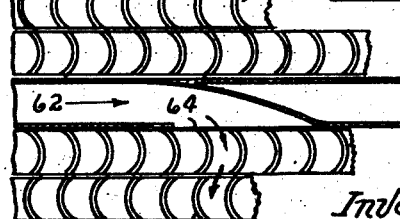
Inventor.
Robert H. Goddard
By Attorney
Chas. P. Hawley Patented July 29, 1947

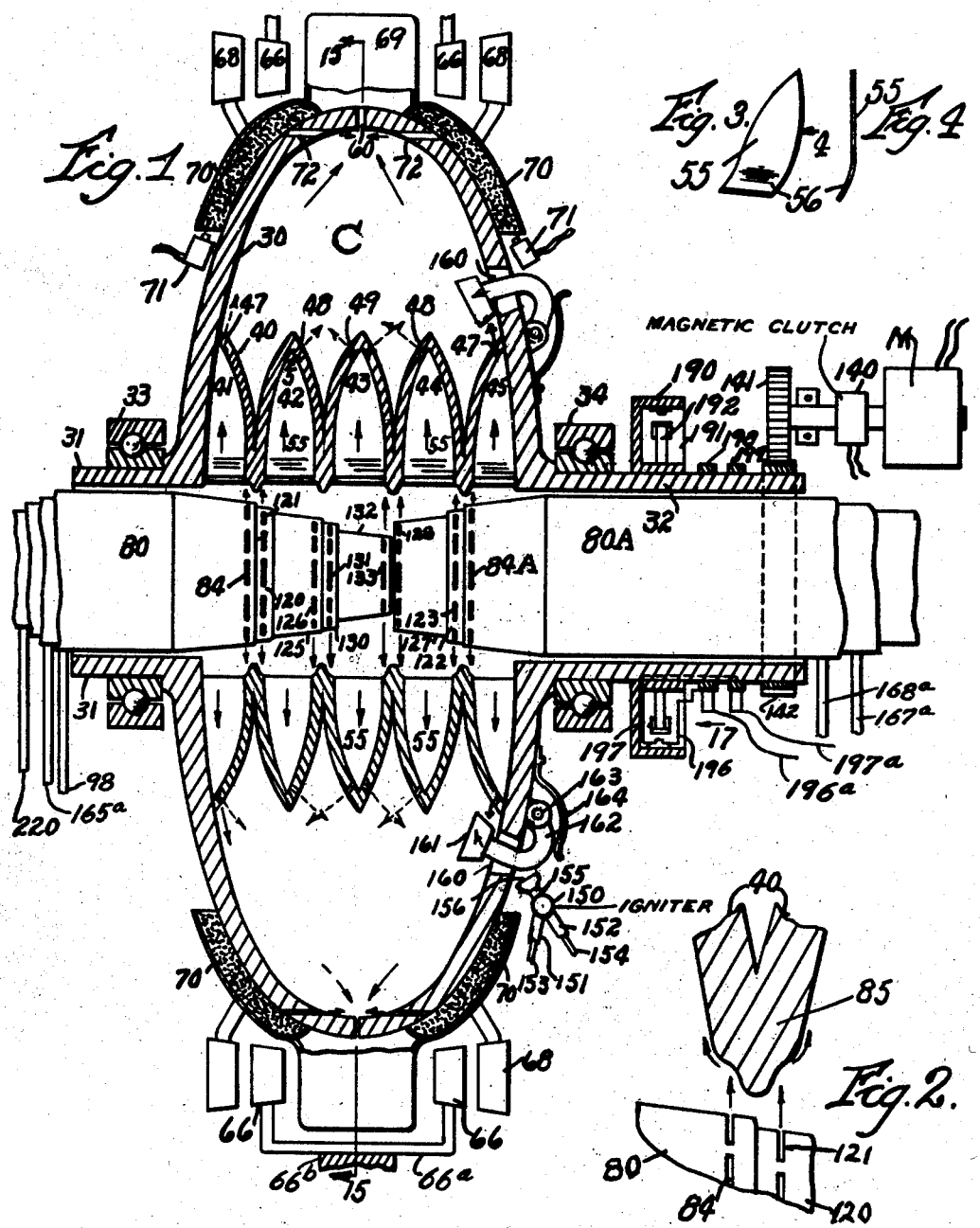

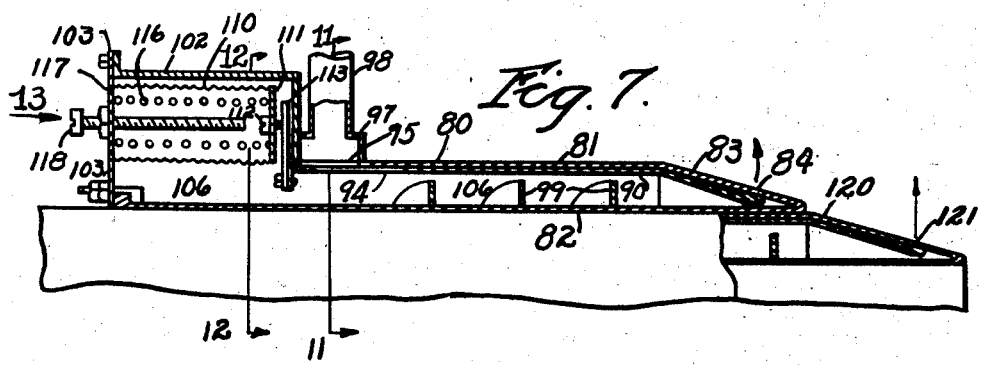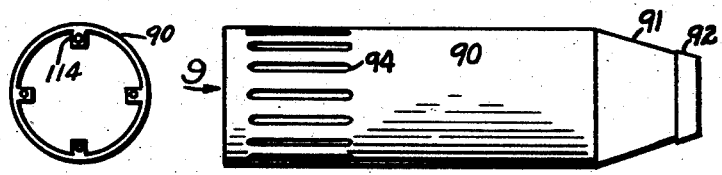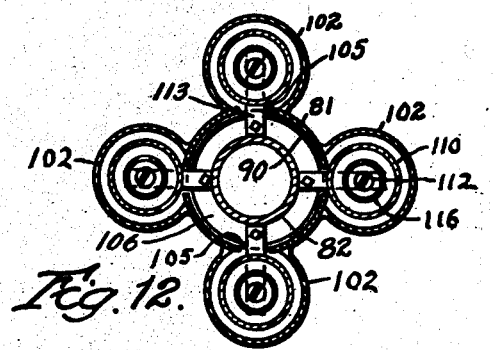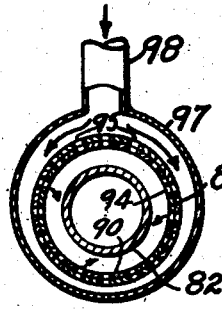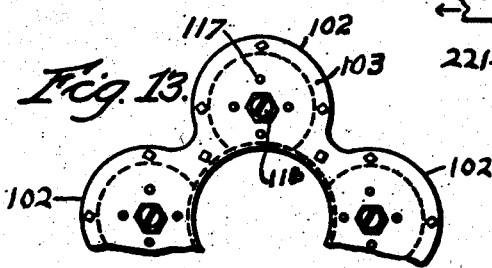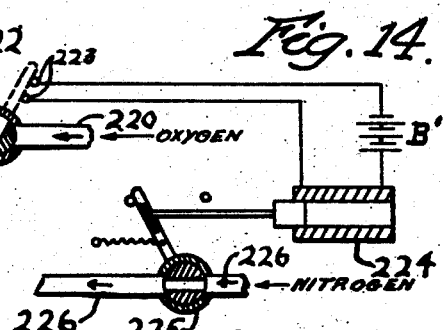

2,424,610

UNITED STATES PATENT OFFICE 2,424,610

ROTATING COMBUSTION APPARATUS

Robert H. Goddard, Roswell, N. Mex., assignor of one-half to The Daniel and Florence Guggenheim Foundation, New York, N. Y., a corporation of New York Application April 12, 1943, Serial No. 482,720

23 Claims. (Cl. 60—46)

This invention relates to combustion apparatus in which the combustion chamber rotates rapidly while in operation, and in which power is generated by the reaction of the combustion gases as they are discharged from the combustion chamber. The apparatus may be used to develop power directly by a turbine effect and without change of locus of the apparatus, or it may be used to develop an axial thrust and a bodily translation of the apparatus by discharge of the combustion gases in one direction only and substantially parallel to the axis of rotation.

Important features of the invention relate to the provision of novel centrifugal means to deliver the various required liquids to the combustion chamber, and to the provision of a novel valve structure to control the flow of said liquids and novel actuating mechanism for said valves. I have also provided effective control means for the combustion apparatus, which is responsive both to changes in speed of rotation and to changes in temperature of ignition.

I also provide means to insure safety from explosion under all conditions and whether the apparatus is in operation or at rest. Other important features of the invention relate to improved devices for cooling the combustion chamber walls during the operation of the apparatus and for rinsing the centrifugal chambers through which a liquid fuel and a liquid oxidizing are supplied to the combustion chamber, said rinsing occurring either before or just after operation of the apparatus.

My invention further relates to arrangements and combinations of parts which will be hereinafter described and more particularly pointed out in the appended claims.

A preferred form of the apparatus is shown in the drawings, in which

Fig. 1 is a sectional front elevation of my improved combustion apparatus;

Fig. 2 is an enlarged fragmentary view of a portion of Fig. 1, partly in section;

Fig. 3 is a perspective view of a centrifugal vane to be described;

Fig. 4 is a side elevation thereof, looking in the direction of the arrow 4 in Fig. 3;

Fig. 5 is a detail view of a portion of a combustion chamber casing, looking in the direction of the arrow 5 in Fig. 1;

Fig. 6 is a sectional view, taken along the line 6—6 in Fig. 5;

Fig. 7 is an enlarged partial front elevation of a special sleeve valve structure, partly in section;

Fig. 8 is a front elevation of a sliding valve member;

Fig. 9 is an end elevation, looking in the direction of the arrow 9 in Fig. 8;

Fig. 10 is a partial perspective view of a spacing member to be described;

Figure 22:
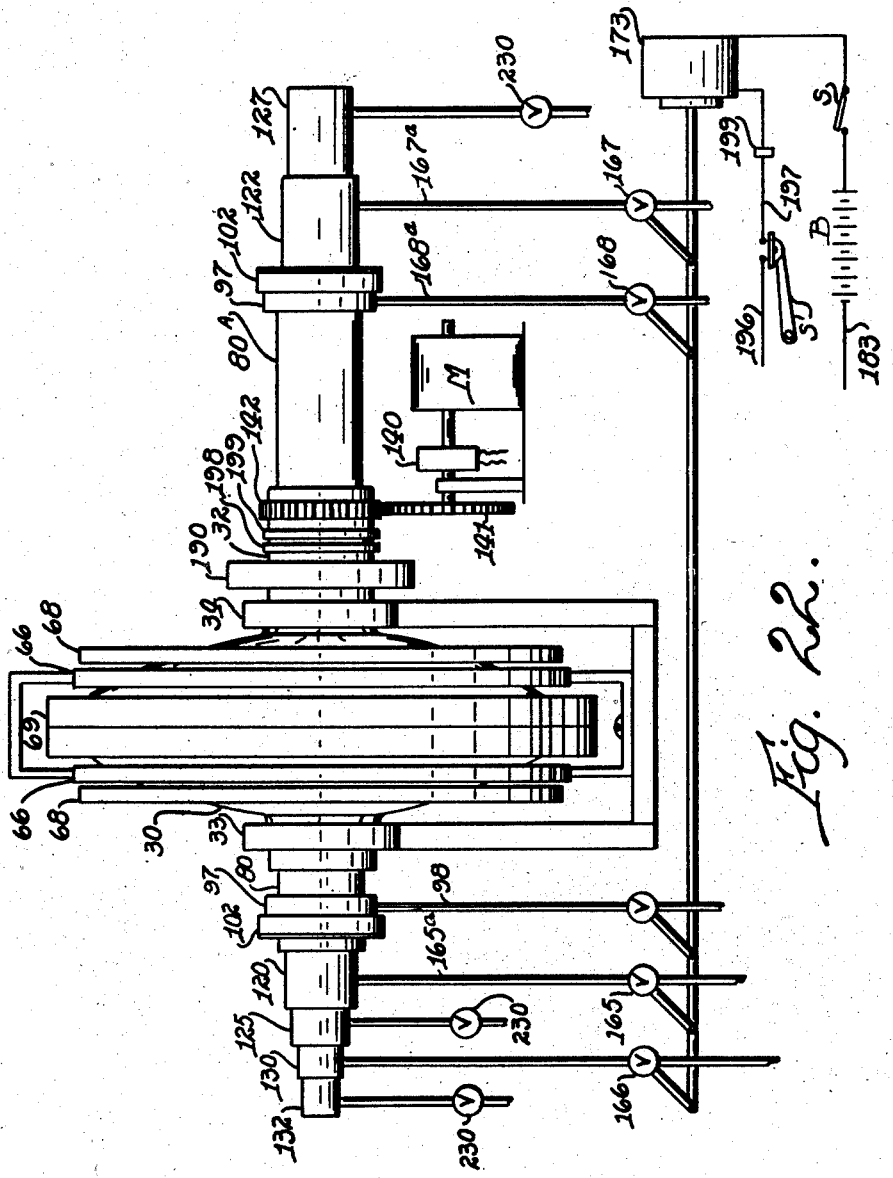

Figs. 11 and 12 are detail sectional side elevations, taken along the lines 11—11 and 12—12 in Fig. 7 respectively;

Fig. 13 is a partial end elevation, looking in direction of the arrow 13 in Fig. 7;

Fig. 14 is a diagram of a valve operating mechanism and a control circuit therefor;

Fig. 15 is a sectional side elevation of the rotating combustion chamber, taken along the lines 15—15 in Fig. 1 but shown on a reduced scale;

Fig. 16 is a partial sectional front elevation of a modified sleeve valve construction having special provision for heat insulation;

Fig. 17 is a side elevation of a centrifugal speed-control device, looking in the direction of the arrow 17 in Fig. 1;

Fig. 18 is a diagram of an operating device for a series of feed valves and a control circuit therefor;

Fig. 19 is an enlarged sectional plan view of a thermostat device also shown in Fig. 18;

Fig. 20 is a diagrammatic view illustrating the action of the combustion gases in developing power;

Fig. 21 is a similar view but shows a modification of the structure shown in Fig. 20; and Fig. 22 is an organization view of my invention.

Referring to the drawings, my improved combustion apparatus comprises a rotating combustion chamber C which is preferably of the oblate spheroid section shown in Fig. 1 and which is enclosed by a casing 30 provided with hub portions 31 and 32 which are rotatably mounted in anti-friction thrust bearings 33 and 34. These thrust bearings not only rotatably support the combustion chamber, but also resist any axial expansion of the chamber due to internal pressure.

A plurality of annular partition members 40 are fixed within the combustion chamber casing 30 and coact with the combustion chamber walls and with each other to define a series of centrifugal compartments 41, 42, 43, 44 and 45.

In the usual operation of the apparatus, the compartments 41 and 45 are supplied with water to cool the inner surfaces of the casing 30. The compartments 42 and 44 are supplied with gasoline or other liquid fuel, and the middle compartment 43 is supplied with liquid oxygen. As the apparatus is rapidly rotated, these various liquids are forced outward through a plurality of holes near the periphery of each partition member.

The holes 47 venting the compartments 41 and 45 are closely adjacent the inner side walls of the casing 30 and provide films of water spreading outward and thus protecting the casing walls from excessive heat. Similar openings 48 in the inwardly facing walls of the centrifugal compartments 42 and 44 direct sprays of gasoline toward the center of the combustion chamber C, and openings 49 in the walls of the middle compartment 43 direct sprays of liquid oxygen outward in the combustion chamber and in directions designed to intersect the gasoline sprays from the openings 48, so that the liquids will be thoroughly intermingled.

It is desirable that the sprays should be relatively widened circumferentially of the compartments 41 to 45, and I have found that this widening effect may be cheaply and easily attained as indicated in Figs. 5 and 6. The widening effect is produced by first forming the holes 47, 48 and 49 in the annular partition members 40, then notching the holes radially on the inner side as indicated at 52 in Figs. 5 and 6 and finally notching the holes circumferentially at the outer side as indicated at 54 in Figs. 5 and 6. These notches may be conveniently produced by the use of a suitable punch or chisel on the inner and outer faces of the partition member 40. This method of manufacture is much quicker and cheaper than the provision of elongated narrow slots around the peripheries of the partition members.

Each compartment 41 to 45 is preferably provided with a series of centrifugal vanes 55 (Figs. 3 and 4) which extend outward more or less radially in each compartment and which are curved near their inner ends as indicated at 56 to pick up liquids with a minimum amount of scattering.

The casing 30 is provided with a series of rearwardly inclined discharge openings 60 (Figs. 1 and 15) through which the combustion gases may pass outward into volute passages 61 and 62 (Figs. 15 and 20). These volute passages are provided at their enlarged and rearward ends with outwardly enlarged side ports or openings 63 and 64, through which openings the combustion gases are delivered more or less axially but in opposite directions, as clearly indicated in Fig. 20.

As the gases escape through the ports or openings 63 and 64, they engage fixed turbine blades 66 (Figs. 1 and 20) and after passing between these blades and being reversed in direction, they engage additional turbine blades 68 mounted to rotate with the combustion chamber. The fixed blades 66 may be non-rotatably supported on any convenient fixed structure, such as the frame 66ª on the fixed support 66ᵇ (Fig. 1). Each set of turbine blades 66 or 68 is closed at top and bottom by the usual shroud rings 68ª (Fig. 20), but is open at both sides. An outer cylindrical casing 69 encloses the volutes 61 and 62 and streamlines the rotating combustion apparatus.

For power development, the opposed discharge arrangement of Fig. 20 is used. For axially translative movement of the combustion apparatus, the volutes may both discharge in the same direction and the movable blades 68 may be omitted. The fixed blades in this case would have straight axial discharge portions, as shown at 68ᵇ in Fig. 21.

As the water spray from the openings 47 is rapidly dissipated as it flows outward, I make special provision for cooling the peripheral portion of the casing 30 which is highly heated and also subject to strong centrifugal stresses. For this purpose, I mount an annular jacket member 70 (Fig. 1) at each side of the outer portion of the casing 30 and direct jets of water into the jacket space through fixed nozzles 71. The injected water moves outward under centrifugal force within the jacket space and escapes through cross passages 72 which communicate with the extreme outer portion of the combustion chamber C at points closely adjacent to the discharge openings 60.

The space between the casing 30 and the jacket casing 70 is preferably packed with metallic fragments, such as aluminum or copper turnings, which have a strong heat-conductive action. Otherwise, steam would form adjacent the outer wall of the casing 30, and the cooling water would be kept away from the wall by the steam and by centrifugal force.

The resilient nature of the metal turnings causes them to maintain good thermal contact with the casing 30 in spite of the natural outward thrust of centrifugal force. The jacket casings 70 and all associated parts except the nozzle 71 are permanently mounted on the casing 30 and rotate therewith.

I will now describe the special sleeve valve construction by which liquids are fed to the various centrifugal compartments. The construction of the outer sleeve valve is clearly shown in Figs. 7 and 8 and comprises a non-rotating annular valve member 80 having an outer casing wall 81 and an inner wall 82, which outer and inner walls are joined at one end by a frustro-conical end portion 83. Circumferential narrow slots or ports 84 (Figs. 1 and 7) are formed in the conical end portion 83 and deliver circumferentially extended flat sprays of water adjacent the part 85 (Fig. 2) where the inner ends of two of the partition members 40 are joined. At this point, the annular surfaces of the part 85 are circumferentially grooved as indicated in Fig. 2 to smoothly receive and divert the sprays of water delivered through the ports 84.

The flow of water through these ports 84 is controlled by a hollow cylindrical sleeve valve member 90 (Fig. 8) having a frusto-conical end portion 91 and a port-closing band or conical seat portion 92. At its opposite end, the sleeve valve 90 is provided with a plurality of elongated ports 94 associated with similar ports 95 in the fixed outer casing wall 81 (Fig. 11).

A double volute casing 97 (Fig. 11) is mounted outside of the fixed casing wall 81 and is supplied with water under pressure through a feed pipe 98. A spiral partition member or baffle plate 99 (Figs. 7 and 10) is mounted on the fixed inner casing wall 82 and causes the water to approach the ports 84 with a less pronounced current.

When the sleeve valve member 90 is moved to the left as shown in Fig. 7, the ports 84 are opened and water is allowed to flow through the ports to the centrifugal compartment 41, where the water is engaged by the centrifugal vanes 55 (Fig. 3) and is caused to rotate rapidly, thus developing a strong centrifugal force by which it is ejected through the passages 47 to the combustion chamber C. When the sleeve valve member 90 is moved to the right, the conical valve seat 92 closes all of the ports 84.

A three-way valve V (Fig. 18) is provided in the feed pipe 98 (Fig. 11) closely adjacent the distributing double volute casing 97. The valve V has a vent pipe 100 and, when in the position shown in Fig. 18, the valve V vents the delivery end of the pipe 98 and the valve structure associated therewith. When turned clockwise 45°, the valve V closes the vent pipe 100 and opens the feed pipe 98 for delivery of water to the distributing volute casing 97.

I have also provided means for automatically withdrawing the valve sleeve 90 as soon as the three-way valve V is opened to admit water under pressure to the sleeve valve. For this purpose, I provide cylindrical compartments 102 (Figs. 7, 12 and 13) permanently mounted at the left-hand end of the outer valve casing wall 81, as viewed in Fig. 7, and closed at their open or free ends by an annular end plate 103.

The outer casing wall 81 is slotted as indicated at 105 (Fig. 12) to provide free communication between the cylindrical compartments 102 and the annular space 106 enclosed by the valve casing walls 81 and 82.

Each bellows member 110 is secured at its outer end to the end plate 103 and is provided at its inner end with a washer plate 111 connected by a screw 112 to an arm 113, which arm in turn is secured to a lug 114 (Fig. 9) which is formed at the open end of the sleeve valve member 90. A compression spring 116 within the bellows member 110 keeps the bellows member normally open and the sleeve valve member 90 is thereby moved to the right to close the ports 84. The interior of each bellows member 110 is vented as indicated at 117, and a stop screw 118 may be adjusted to limit the travel of the plate 111 and of the sleeve valve member 90.

When water under pressure is admitted to the annular space 106 within the sleeve valve 80, pressure is thereby applied to the outer surface of the bellows member 110 and the plate 111, compressing the bellows member against the resistance of the spring 116 and opening the circumferential ports 84. When the pressure in the annular valve space 106 is relieved, the spring 116 promptly moves the valve member 90 to the right and closes the ports 84.

In the assembled apparatus, a plurality of such sleeve valves are provided for the various liquids used in the operation of the apparatus, and these valves are nested concentrically and preferably in a left-hand and a right-hand series.

The sleeve valve 80 above described supplies water through ports 84 to the centrifugal compartment 41. A similar sleeve valve 80A in the right-hand valve series supplies water through ports 84A to the right-hand centrifugal compartment 45. A sleeve valve 120 supplies gasoline or other liquid fuel through ports 121 to the centrifugal compartment 42 and a similar sleeve valve 122 supplies liquid fuel through ports 123 to the compartment 44. A sleeve valve 125 applies a neutral liquid such as carbon tetrachloride through ports 126 for the purpose of flushing or rinsing the gasoline compartment 42. A corresponding sleeve valve 127 supplies a similar neutral liquid through ports 128 for the gasoline compartment 44. A sleeve valve 130 supplies liquid oxygen to ports 131 to the middle centrifugal compartment 43, and a sleeve valve 132 supplies liquid nitrogen or a similar non-active liquid to ports 133 for the purpose of rinsing the compartment 43.

Nested sleeve valves as described are essential in order to provide sufficiently large flows of the several liquids into the various centrifugal compartments without requiring unduly large diameters for the chamber hubs 31 and 32. Each of these valves may be of the construction shown in Figs. 7 to 13, with necessary variations in length and diameter to permit nesting and to permit the provision of bellows-operating members for the different slidable valve-closing members.

It is of particular importance that provision be made for shutting off the delivery ports for each sleeve valve at the extreme inner end of the valve and closely adjacent the point of delivery of the liquid to the associated centrifugal compartment.

The provision of neutralizing and rinsing liquids in the gasoline and oxygen compartments is very essential, as the centrifugal force which ejects these liquids drops rapidly after valve closure and as the amount of liquid in the compartment is progressively reduced. Consequently, the partially emptied compartments become filled with gasoline or oxygen vapors which easily form explosive mixtures if not effectively rinsed or cleared from the compartments.

As effective operation of the apparatus depends on centrifugal force, it is necessary to provide auxiliary means for starting the combustion apparatus in rotation and for bringing said apparatus up to operative speed. For this purpose, I provide a motor M (Fig. 1) connected through a magnetic clutch 140 and gear 141 to a ring gear 142 on the combustion chamber hub 32. When the apparatus has reached the desired speed of rotation, the circuit of the magnetic clutch 140 may be opened to deenergize the clutch, and this circuit-opening may be controlled either manually or automatically.

In starting the apparatus, it is also necessary to make use of an external igniter 150 (Fig. 1) which in itself forms no part of my present invention and which may be of the general construction shown in my prior Patent No. 2,090,039, issued August 17, 1937. For present purposes, it is sufficient to state that the igniter comprises an oxygen supply pipe 151, gasoline supply pipe 152, needle valves 153 and 154 for said supply pipes, and a mixing chamber connected to a delivery pipe 155 having an enlarged inner end 156.

The combustion chamber C is provided with two or more inwardly opening ports 160 (Fig. 1) each having a valve member 161 mounted on an arm 162 pivoted at 163 on a bracket secured to the casing 30. A leaf spring 164 normally holds each valve member 161 in the inner or open position shown in Fig. 1 when the apparatus is at rest. With the ports 160 thus open, the flame from the fixed igniter 150 will be intermittently projected through the ports 160 as the combustion chamber C starts to rotate and will thus be available to ignite any combustible mixture as it is developed in the combustion chamber.

It is desirable that the igniter be in effective operation and that the combustion chamber reach a minimum speed of rotation before the gasoline, oxygen and water are introduced to the centrifugal compartments 41 to 45. For this reason, I connect a series of three-way valves V, 165, 166, 167 and 168 (Fig. 18) by arms 170 to an actuating rod 171 adapted to be moved in one direction to close the valves by a spring 172 and in the opposite direction to open the valve by a solenoid 173. The valves V and 168 control the water supply through the pipes 98 and 168ᵃ (Figs. 18 and 7) to the compartments 41 and 45, the valves 165 and 167 similarly control the gasoline supply to the compartments 42 and 44 through the pipes 165ᵃ and 167ᵃ, and the valve 166 controls the oxygen supply to the compartment 43 through the pipe 220.

The control circuit for the solenoid 173 is shown in Fig. 18 as comprising a battery B, a hand switch S, a thermostatic device T and a speed controlled switch S'.

The thermostat device T (Figs. 18 and 19) is mounted in the enlarged end 156 (Fig. 1) of the delivery pipe 155 of the igniter 150, and comprises a bi-metallic thermal member 180 (Fig. 19) mounted on a fixed support 181 having an opening 182 through which the ignition gases are delivered adjacent the ports 160 (Fig. 1).

A wire 183 (Fig. 18) connects one terminal of the battery B to an insulated stud 184 (Fig. 19) in the igniter casing extension 156, and a second wire 186 is connected to the thermal member 180. As the heat increases and the thermal member 180 expands, contact is eventually established between the member 180 and the stud 184, thus closing the circuit so far as the heat-controlled thermostatic device T is concerned.

The speed control for the switch S' (Fig. 18) is shown in Figs. 1 and 17 and comprises a member 190 fixed to rotate with the combustion chamber hub 32 and having an annular recess 191 in which a pair of arms 192 are pivotally mounted for outward movement under centrifugal force and against the action of springs 194. Each arm 192 carries an insulated contact strip 195 adapted to connect the two contacts of the switch S' when a certain minimum speed is attained. Two opposite arms 192 are provided to balance the rotating structure, and two switches S' may be connected in parallel or one arm may be left inoperative. The wires 196 and 197 (Fig. 17) from the contacts of the switch S' may be connected to collector rings 198 and 199 (Fig. 1), with which rings contact may be maintained from central circuit wires 196ᵃ and 197ᵃ (Figs. 1 and 18) by the usual brushes.

Assuming that the manually-operated switch S has been closed, that the igniter 150 has been put in operation and that the motor M has been energized to start the combustion chamber in rotation, the circuit for the valve-operating solenoid 173 will be completed when the temperature is high enough to close the thermostatic device T and when the speed is high enough to close the speed-control switch S'. When this occurs, the solenoid 173 is energized, the various valves which control the supply of water, gasoline and oxygen are opened, and the apparatus thereafter functions to produce power.

As the rotating apparatus reaches its full operating speed, centrifugal force acting on the valve members 161 will cause them to swing outward and close the ignition ports 160. It is obviously unnecessary to operate the igniter 150 after the ignition ports 160 have been closed, and the operation of the igniter is accordingly discontinued, either manually or automatically, when this condition prevails.

It is then necessary to prevent breaking of the circuit controlling the solenoid 173 when the thermostatic device T cools off and the thermal member 180 contracts. Accordingly, I provide the by-pass construction shown in the upper part of Fig. 18. In this construction, the wire 186 connects the thermal member 180 to a lower terminal 201 with which a magnet armature 202 normally contacts. Such contact completes a circuit through a holding magnet 203.

As soon as the circuit is closed through the thermostatic device T and the speed-control switch S', the magnet 203 is energized, thus raising the armature 202 to engage an upper terminal 204 connected by a wire 205 to the wire 183 previously described. With the armature 202 thus raised, the circuit for the solenoid 173 is thereafter maintained through the shunt wire 205, and further maintenance of the circuit through the thermostatic member T is unnecessary, as thereafter the open or closed condition of this original circuit becomes immaterial.

Certain of the sleeve valves previously described are used to supply very cold liquids, such as liquid oxygen or liquid nitrogen, and these valves will gradually accumulate frost and ice and finally freeze, if special provision is not made to prevent this. For handling these very cold liquids, I accordingly provide the modified sleeve valve construction shown in Fig. 16, in which the nitrogen sleeve valve 132 is shown as provided with ports 133 and with a sliding valve member 132ᵃ.

To prevent freezing, I provide a layer 210 of heat-insulating material enclosing the sleeve valve 132 and having openings aligned with the ports 133. Outside of this insulating covering 210, I provide an outer double tubular casing 211 having ports 212, also aligned with the ports 133. A sliding valve member 213 is provided for the outer casing 211, and this valve member operates the same as the regular sliding valve member 132ᵃ and simultaneously therewith. It is important to notice, however, that while the valve member 132ᵃ entirely closes the ports 133, the valve member 213 almost but not quite closes the ports 212, thus leaving slight port openings for a purpose to be described.

An annular space 214 is provided between the insulating covering 210 and the sliding valve member 213, and a relatively warm and inert gas, such as nitrogen gas, is introduced into the space 214 when the flow of cold liquid nitrogen through the ports 133 is interrupted.

The slight openings left at the ports 212 permit a slow seepage of gas through the space 214 when the valve member 213 is in substantially closed position, and this seepage prevents the accumulation of frost and ice and the freezing of the liquid nitrogen valve which would otherwise take place. A similarly constructed valve is also provided for the liquid oxygen.

It is desirable to shut off the supply of relatively warm gas when the tubular valve is opened to permit flow of the cold liquid to the associated centrifugal compartment, and this is particularly important in the valve controlling liquid oxygen, which oxygen would otherwise be diluted by the inert nitrogen gas.

In Fig. 14 I have shown valve-control mechanism which insures that the inert gas in the jacket space 214 will be shut off when the cold liquid is being delivered through the sleeve valve and will be admitted when the flow of cold liquid is interrupted. The three-way valve 166 for liquid oxygen is indicated as being installed in an oxygen supply pipe 220 and as being provided with a vent 221 to the atmosphere, these parts being also shown in Fig. 18. An arm 222 on the three-way valve 166 will be moved to engage contacts 223 when the valve 166 is opened to admit liquid oxygen. The contacts 223 are in a circuit which also includes a battery B' and a solenoid 224. When the contacts are connected by the arm 222, the solenoid is energized and the valve 225 is shifted from open to closed position. This valve 225 controls the flow of nitrogen gas through the pipe 226 by which gas is delivered to the jacket space 214 (Fig. 16).

With this construction, opening of the valve 166 closes the valve 225, and venting of the valve 166 opens the valve 225. Consequently, nitrogen gas is admitted to the jacket space when the flow of oxygen is interrupted but is excluded from the jacket space when the delivery ports for the liquid oxygen are open.

Having described the details of construction of my improved combustion apparatus, the method of operation will be easily understood.

Prior to starting the apparatus, the centrifugal compartments for gasoline and oxygen are preferably rinsed by introducing small quantities of neutral or inert liquids, such as liquid nitrogen for the oxygen compartment and carbon tetrachloride or some similar neutral liquid for the gasoline compartments. It is not desirable to use a very cold liquid such as liquid nitrogen in the gasoline compartments, as any residue of gasoline would be promptly frozen. The introduction of the inert liquids for rinsing purposes may be either manually or automatically controlled by valves 230 (Fig. 22) and such control forms no part of my present invention.

After rinsing the gasoline and oxygen compartments to remove any explosive mixtures therefrom, the apparatus may be started by closing the switch S (Fig. 18) and also energizing the motor M (Fig. 1), at the same time placing the igniter 150 in operation.

When the combustion chamber has been brought up to the predetermined minimum speed of rotation, the switch S' (Fig. 18) will be automatically closed, and when the temperature in the igniter 150 has been raised to a predetermined and operative point, the thermostatic device T will close, thus completing the circuit of the solenoid 173 and causing the solenoid to open the valves shown in Fig. 18. These valves control the feed of cooling water, gasoline and liquid oxygen to the various centrifugal compartments.

As soon as a combustible mixture of oxygen and gasoline has been produced in the combustion chamber, this mixture will be ignited by the flame from the igniter 150 through the open ports 160, which ports will thereafter close automatically as the speed of rotation is further increased.

Additional cooling liquid may be introduced under either manual or automatic control through the nozzles 71. This cooling liquid, on leaving the jackets 70, is delivered to the combustion chamber at its peripheral and hottest portion and adjacent the discharge openings 60. Portions of the cooling liquid will be drawn into the discharge openings, thus preventing burning of the walls of the openings and reducing the temperature of the gases in the volutes 61 and 62.

The apparatus will continue in operation until the sleeve valves are operated to shut off the supply of liquids to the centrifugal compartments and thence to the combustion chamber. The gasoline and oxygen compartments are then preferably rinsed a second time as previously described. Whenever the cold liquid oxygen and liquid nitrogen are shut off, introduction of relatively warm nitrogen gas will be automatically effected in the jacket spaces of the special tubular valves shown in detail in Fig. 16.

I have thus provided rotating combustion apparatus in which the construction and method of operation is relatively simple, in which the feeding of the necessary liquids is easily accomplished and controlled, and in which safe starting, safe operation and safe stopping is attained.

Having thus described my invention and the advantages thereof, I do not wish to be limited to the details herein disclosed, otherwise than as set forth in the claims, but what I claim is:

1. In a rotatable combustion apparatus, a rotated combustion chamber of substantially elliptical axial section and having a peripheral combustion space, an axial series of inner centrifugal liquid-feeding compartments all mounted within said combustion chamber and rotated therewith and comprising complete and partial hollow discs of flattened elliptical axial section, each compartment having an unobstructed annular opening to a common central passage which is maintained at atmospheric pressure and each compartment having a circular series of peripheral ports to said combustion space, and means to direct unconfined jets of liquid combustible and liquid oxidizing agents transversely of said central atmospheric passage to the inner annular openings of separate selected centrifugal compartments.

2. In a rotatable combustion apparatus, a rotated combustion chamber having a peripheral combustion space, a series of inner centrifugal liquid-feeding compartments, and means to feed liquid combustible and oxidizing agents to adjacent centrifugal compartments, and said adjacent compartments having peripheral ports discharging in intersecting directions and through which said liquids are delivered to said combustion chamber in intersecting sprays.

3. In a rotatable combustion apparatus, a rotated combustion chamber having hollow and rotatably mounted hub portions, a plurality of sleeve valves of graduated diameters and each having inner and outer cylindrical walls, whereby said valves may be concentrically nested in said hollow hub portions, said valves supplying combustible and oxidizing liquids to said chamber, and a single means to open and close said nested valves.

4. In a rotatable combustion apparatus, a rotated combustion chamber having hollow and rotatably mounted hub portions, a plurality of sleeve valves concentrically nested in said hollow hub portions and supplying combustible and oxidizing liquids to said chamber, and means to open and close a plurality of said nested valves simultaneously.

5. In a rotatable combustion apparatus, a rotated combustion chamber having hollow and rotatably mounted hub portions, a plurality of sleeve valves nested in said hollow hub portions and supplying combustible and oxidizing liquids to said chamber, said valves having peripheral delivery ports near their closed inner ends, and a single sliding valve member effective to simultaneously close all of the ports in a selected sleeve valve.

6. In a rotatable combustion apparatus, a rotated combustion chamber having hollow and rotatably mounted hub portions, a plurality of sleeve valves nested in said hollow hub portions and supplying combustible and oxidizing liquids to said chamber, said valves having peripheral delivery ports near their closed inner ends, a single sliding valve member effective to simultaneously close all of the ports in a selected sleeve valve, a supply valve for each sleeve valve, and coacting means coordinating the movements of said supply valve and said sliding valve and effective to move said sliding valve member to open said delivery ports when the associated supply valve is opened.

7. In a rotatable combustion apparatus, a rotated combustion chamber having hollow and rotatably mounted hub portions, a plurality of sleeve valves nested in said hollow hub portions and supplying combustible and oxidizing liquids to said chamber, said valves having peripheral delivery ports near their closed inner ends, a single sliding valve member effective to simultaneously close all of the ports in a selected sleeve valve, a supply valve for each sleeve valve, means to move said sliding valve member to open said delivery ports when the associated supply valve is opened, and said latter means including a control device operated by the liquid pressure in said sleeve valve.

8. In a rotatable combustion apparatus, a rotated combustion chamber having hollow and rotatably mounted hub portions, a plurality of sleeve valves nested in said hollow hub portions and supplying combustible and oxidizing liquids to said chamber, said valves having peripheral delivery ports near their closed inner ends, a single sliding valve member effective to simultaneously close all of the ports in a selected sleeve valve, a supply valve for each sleeve valve, means to move said sliding valve member to open said delivery ports when the associated supply valve is opened, and said latter means including a control device comprising a plurality of bellows operators each responsive to an increase in the liquid pressure in said tubular sleeve valve.

9. In a rotated combustion apparatus, a combustion chamber, a plurality of inner centrifugal compartments for said chamber, means to supply very cold liquids to certain of said compartments, tubular sleeve valves controlling the flow of said very cold liquids, jackets for said sleeve valves, means to supply a relatively warm inert gas to each jacket space, and coacting automatic means effective to admit said gas to a selected jacket space and to simultaneously interrupt the flow of cold liquid to the associated centrifugal compartment, whereby dilution of the cold liquid for said compartment by said inert gas is avoided.

10. In a rotated combustion apparatus, a tubular sleeve valve having delivery ports adjacent its closed inner end, a jacket casing for said valve having ports aligned with said delivery ports, valve means controlling the admission of a very cold liquid to said tubular valve, valve means controlling the admission of a relatively warm inert gas to said jacket space, sliding valve members effective to close the delivery ports and to almost close the jacket ports, and coordinated operating means effective to open and close said two valve means alternately and simultaneously, whereby dilution of the cold liquid by the inert gas is prevented.

11. In a rotatable combustion apparatus, a rotated combustion chamber having a plurality of partitions therein providing a series of centrifugal liquid-spraying compartments, means to supply a very cold liquid to one of said compartments, a tubular sliding valve controlling the delivery of said very cold liquid to said compartment, an insulating covering for said tubular valve, a jacket outside of said insulating covering, means to admit a relatively warm inert gas to said jacket, and devices coordinating said admitting means and said supply means and effective to insure alternate admission of said cold liquid and said inert gas, whereby dilution of the cold liquid by the inert gas is prevented.

12. In a rotated combustion apparatus, a rotated combustion chamber, inner centrifugal compartments effective to feed combustible and oxidizing liquids to said chamber, auxiliary means to rotate said chamber, and speed-responsive means to prevent admission of said liquids to said compartments until said chamber is rotating at a predetermined minimum speed.

13. In a rotated combustion apparatus, a rotated combustion chamber, inner centrifugal compartments effective to feed combustible and oxidizing liquids to said chamber, an igniter for the combustion chamber, and thermostatic means to prevent admission of said liquids to said compartments until said igniter develops a predetermined ignition temperature.

14. In a rotated combustion apparatus, a rotated combustion chamber, inner centrifugal compartments effective to feed combustible and oxidizing liquids to said chamber, an igniter for the combustion chamber, thermostatic means to prevent admission of said liquids to said compartments until said igniter develops a predetermined ignition temperature, and means to bypass said igniter as said liquids are thus admitted.

15. In a rotatable combustion apparatus, a rotated combustion chamber, a plurality of inner centrifugal compartments through which combustible and oxidizing liquids are fed to said chamber, and valve means effective to selectively control the admission of inert fluids to rinse said centrifugal compartments.

16. In a rotatable combustion apparatus, a rotated combustion chamber, and a plurality of inner centrifugal compartments through which combustible and very cold oxidizing liquids are fed to said chamber, and the walls of said compartments being spaced apart to prevent heat transfer between said compartments and freezing of the combustible liquid.

17. In a rotatable combustion apparatus, a rotated combustion chamber, centrifugal means to inject a cooling liquid to form a film adjacent the inner portions of the walls of said combustion chamber, a jacket for the peripheral portion of said combustion chamber and rotatable therewith, and means to supply a cooling liquid to said jacket.

18. In a rotatable combustion apparatus, a rotated combustion chamber, centrifugal means to inject a cooling liquid to form a film adjacent the inner portions of the walls of said combustion chamber, a jacket for the peripheral portion of said combustion chamber and rotatable therewith, means to supply a cooling liquid to said jacket, and ports connecting the outer part of the jacket space to the peripheral combustion space of said rotated chamber.

19. In a rotatable combustion apparatus, a rotated combustion chamber, centrifugal means to inject a cooling liquid to form a film adjacent the inner portions of the walls of said combustion chamber, a jacket for the peripheral portion of said combustion chamber and rotatable therewith, fixed nozzles to supply a cooling liquid to said jacket, and a filling of metal turnings for said jacket having high heat-conductive qualities, 20. In a rotatable combustion apparatus, a rotated combustion chamber, a fixed igniter, ports in the wall of said chamber movable in a circular path past said igniter and intermittently admitting the igniter flame to said chamber, and normally open valves for said ports, each valve being pivoted to the outer wall of the combustion chamber at one side of the associated valve port and being unbalanced with respect to said port and being thereby responsive to centrifugal force and movable by centrifugal force to closed position when said chamber is rotated at not less than a predetermined speed.

21. In a rotatable combustion apparatus, a rotated combustion chamber, a fixed igniter, ports in the wall of said chamber movable in a circular path past said igniter and intermittently admitting the igniter flame to said chamber, normally open valves for said ports, each valve being pivoted to the outer wall of the combustion chamber at one side of the associated valve port and being unbalanced with respect to said port and being thereby responsive to centrifugal force and movable by centrifugal force to closed position when said chamber is rotated at not less than a predetermined speed, and means to overcome the centrifugal force and to move said valves to open said ports when said chamber is rotated at less than said predetermined speed.

22. In a rotated combustion apparatus, a tubular sleeve valve having inner and outer walls, a tubular valve member slidable within but adjacent said outer wall, and a partition member mounted on the inner wall of said tubular valve and forming a helical baffle in the space between said inner wall and said sliding tubular valve member.

23. In a rotatable combustion apparatus, a rotated combustion chamber having a plurality of inner centrifugal liquid-feeding compartments, means to feed liquids to the inner portions of said compartments, delivery openings at the peripheries of said compartments, and vanes in said compartments effective to pick up and rotate the liquids fed thereto and to deliver said liquids to said peripheral delivery openings.

ROBERT H. GODDARD.

REFERENCES CITED

The following references are of record in the file of this patent:

UNITED STATES PATENTS

| Number | Name | Date |
| --- | --- | --- |
| 16,848 | McHenry | Mar. 17, 1857 |
| 42,049 | Martin | Mar. 22, 1864 |
| 368,266 | Wright | Aug. 16, 1887 |
| 1,046,718 | Aull | Dec. 10, 1912 |
| 1,140,514 | Haverstick | May 25, 1915 |
| 1,501,849 | Johnson | July 15, 1924 |
| 1,932,702 | Langdon | Oct. 31, 1933 |
| 1,960,810 | Gordon | May 29, 1934 |
| 1,988,945 | Hansen | Jan. 22, 1935 |
| 2,188,128 | Armstrong | Jan. 23, 1940 |

FOREIGN PATENTS

| Number | Country | Date |
| --- | --- | --- |
| 445,550 | Great Britain | Apr. 9, 1936 |
| 339,847 | France | Apr. 28, 1904 |
| 383,966 | France | Jan. 23, 1908 |
| 476,033 | Germany | May 8, 1929 |